United States Patent
Zahniser et al.

(10) Patent No.: US 8,103,072 B2
(45) Date of Patent: Jan. 24, 2012

(54) METHOD AND SYSTEM FOR IDENTIFYING BIOLOGICAL SPECIMEN SLIDES USING UNIQUE SLIDE FINGERPRINTS

(75) Inventors: Michael Zahniser, Cambridge, MA (US); David Zahniser, Wellesley, MA (US)

(73) Assignee: Cytyc Corporation, Marlborough, MA (US)

( * ) Notice: Subject to any disclaimer, the term of this patent is extended or adjusted under 35 U.S.C. 154(b) by 613 days.

(21) Appl. No.: 12/340,232

(22) Filed: Dec. 19, 2008

(65) Prior Publication Data

US 2010/0021037 A1   Jan. 28, 2010

Related U.S. Application Data (60) Provisional application No. 61/015,111, filed on Dec. 19, 2007.

(51) Int. Cl.
*G06K 9/00* (2006.01)

(52) U.S. Cl. ......... 382/128; 382/133

(58) Field of Classification Search .......... 382/128, 382/130, 132, 133, 153, 115
See application file for complete search history.

(56) References Cited

U.S. PATENT DOCUMENTS

| | | | |
|---|---|---|---|
| 5,561,556 A * | 10/1996 | Weissman | 359/396 |
| 5,919,553 A | 7/1999 | Kavanaugh | |
| 5,949,901 A | 9/1999 | Nichani et al. | |
| 7,395,974 B2 * | 7/2008 | Albany | 235/492 |
| 7,400,753 B2 * | 7/2008 | Seino et al. | 382/128 |
| 2005/0019796 A1 | 1/2005 | Meiring et al. | |
| 2010/0301997 A1 * | 12/2010 | Cole et al. | 340/5.53 |

FOREIGN PATENT DOCUMENTS

WO   0051058   8/2000

OTHER PUBLICATIONS

PCT International Search Report and Written Opinion for PCT/US2008/087781, Applicant CYTYC Corporation, Forms PCT/ISA/210, 220, and 237 dated Apr. 6, 2009 (14 pages).

* cited by examiner

*Primary Examiner* — Louis Arana (74) *Attorney, Agent, or Firm* — Vista IP Law Group LLP (57) ABSTRACT

Method and system for processing specimen slides. A first image of a unique feature, such as a fiducial mark, of a specimen slide is acquired, and a second image of the same region of a fiducial mark is acquired at a later time. The first and second fiducial mark images are compared in order to determine whether they are images of the same fiducial mark of the same specimen slide, thereby allowing the system to detect when one specimen slide has been swapped with another specimen slide. The comparison may also involve images of multiple features on the specimen carrier, e.g., sets of multiple fiducial marks.

19 Claims, 10 Drawing Sheets

METHOD AND SYSTEM FOR IDENTIFYING BIOLOGICAL SPECIMEN SLIDES USING UNIQUE SLIDE FINGERPRINTS

RELATED APPLICATION DATA

The present application claims the benefit under 35 U.S.C. §119 to U.S. provisional patent application Ser. No. 61/015,111, filed Dec. 19, 2007. The foregoing application is hereby incorporated by reference into the present application in its entirety.

GOVERNMENT RIGHTS

This invention was made with Government support under grant number RR018046 awarded by the National Institutes of Health. The Government has certain rights in the invention.

FIELD OF THE INVENTION

The present inventions relate to imaging and analysis of biological specimens and, more particularly, to verifying the identification of a biological specimen slide.

BACKGROUND

In cytology, an automated imaging system is used to analyze cellular material contained on a slide or other biological specimen carrier. For example, an imaging system might be used to help a cytotechnologist analyze a Pap smear slide. Preparation of a Pap smear slide involves scraping cells from a woman's cervix and depositing those cells on a slide. The slide is then reviewed by a cytotechnologist who screens the slide for cancerous or precancerous cells. This review can be done more quickly and more accurately if an automated imaging system first identifies objects (portion of the specimen) on the slide that are likely or more likely to be cancerous, and directs the cytotechnologist's attention to those identified objects.

Figure 1:
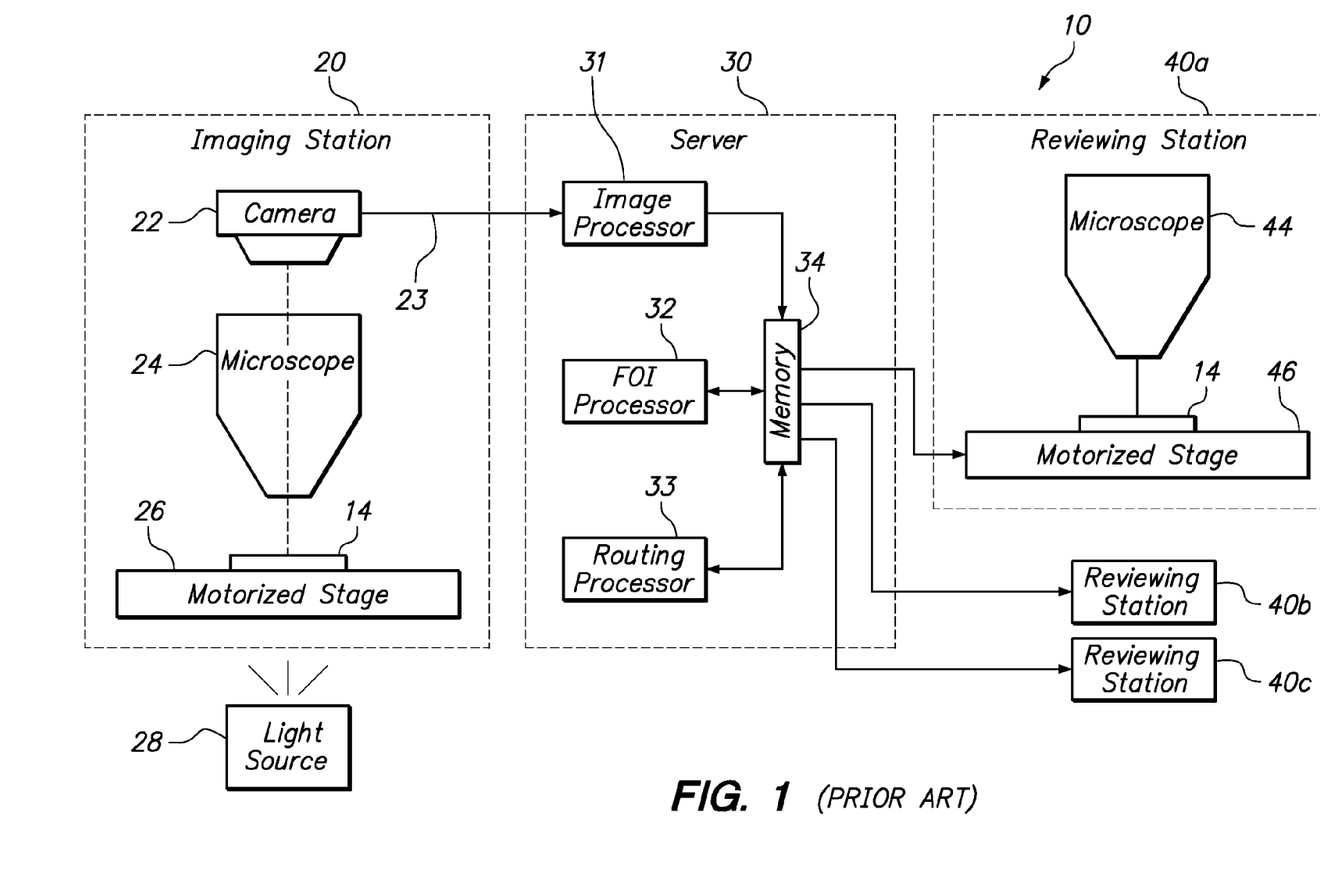
FIG. 1 illustrates a known biological screening system.

FIG. 1 generally illustrates one known automated imaging system 10 that may be used to analyze Pap smear slides and other cytological specimen slides (generally illustrated in FIG. 2), available from Hologic, Inc., 250 Campus Drive, Marlborough, Mass. 01752. In particular, the system 10 is configured for imaging and presenting a biological specimen 12 located on a microscope slide 14. The system 10 includes an imaging station 20 that is configured to image the specimen 12 on the slide 14, which is typically contained within a cassette (not shown in FIG. 1) along with other slides. During the imaging process, slides 14 are removed from the respective cassettes, imaged, and returned to the cassettes in a serial fashion.

One known imaging station 20 includes a camera 22, a microscope 24, a motorized stage 26 and a light source 28. The slide 14 is mounted on the motorized stage 26, which scans the slide 14 relative to the viewing region of the microscope 24, while the camera 22 captures images of various regions of the specimen 12. The motorized stage 26 tracks the x-y coordinates of the images as they are captured by the camera 22. The x-y coordinates tracked by the stage 26 may be measured relative to one or more fiducial marks 16a-c (generally fiducial mark 16) affixed to the slide 14. A fiducial mark 16 may be a rectangular patch of paint that is applied to the slide 14 using silk screening methods. One corner of the fiducial mark 16 may be considered to be the mark's 16 location.

Image data 23 generated by the imaging station 20 is processed by a server 30 that includes suitable hardware and software (e.g., one or more processors 31-33) to select and store identified objects of interest (OOIs), which are arranged in Fields of Interest (FOI) of the imaged biological specimen 12. The OOIs may then be presented to a cytotechnologist, who can then review them using one or more reviewing stations 40A-C (generally referred to as reviewing station 40) and that includes a microscope 44 and a motorized slide holder or stage 46. During the review process, the slide 14 is mounted on the motorized stage 46, which moves the slide 14 relative to the viewing region of the microscope 44 based on the routing plan and a transformation of the x-y coordinates of FOIs are obtained from memory 34. Coordinates of the slide 14 determined during the reviewing process are correlated to the x-y coordinates of the slide 14 during the imaging process using fiducial marks 16. The motorized stage 46 moves according to the transformed x-y coordinates of the FOIs, as dictated by the routing plan.

Typically, slides are labeled with a number, bar code, or other identification. This identifying information can either be manually entered into an imaging system by a human operator, or it can be read by an optical character recognition (OCR) camera or bar code reader. In the latter case, the imaging system will contain at least two imaging devices. One imaging device views the microscopic features of the slide, such as cells. The other imaging device views the slide on a macroscopic level, in order to read the identifying information.

An automated imaging system will typically generate some data associated with each slide it processes. This data may be stored or reported to the operator. It is essential that the data be associated with the proper slide. An imaging system may be designed such that during slide processing, the operator may remove a first slide that has been loaded into the system and replace it with a second slide. However, if the system cannot detect that the first slide has been replaced by the second slide, the system may incorrectly associate data from the first slide with the second slide, or vice versa and, therefore, it may be necessary to discard the data.

There are several different ways in which an imaging system can detect when one slide has been replaced with another slide. Some automated imaging systems include a custom-made slide holder that incorporates a slide removal sensor. Systems may also incorporate an OCR reader or bar code scanner to read identifying information of the slide before and after it is processed to ensure that the slide was not swapped with another during processing. Such custom components, however, increase the cost and complexity of imaging systems.

Further, certain imaging may not include a slide removal sensor or an OCR reader or bar code scanner, e.g., due to cost, space and integration issues. With these types of systems, it may be difficult to confirm that certain data is associated with a particular slide and that one slide has not been swapped with another during processing.

SUMMARY

One embodiment is directed to a method of identifying a biological specimen carrier. The method includes acquiring a first image of a fiducial mark on a biological specimen carrier and acquiring a second image of a fiducial mark on a biological specimen carrier. The method further includes comparing the first and second fiducial mark images, and determining whether the first and second fiducial mark images are of the same fiducial mark of the same biological specimen carrier based on the comparison.

A further embodiment is directed to a method of identifying a biological specimen carrier that includes acquiring a first image of a plurality of fiducial marks on a biological specimen carrier and acquiring a second image of a plurality of fiducial marks on a biological specimen carrier. The first and second fiducial mark images are compared, and a determination whether the first and second fiducial mark images are of the same plurality of fiducial marks of the same biological specimen carrier is made based on the comparison.

Another embodiment is directed to a method of identifying a biological specimen carrier and includes acquiring a first image of a unique element of a biological specimen carrier and acquiring a second image of a unique element of a biological specimen carrier. The first and second images are compared, and a determination is made whether the first and second images are of the same unique element of the same biological specimen carrier based on the comparison.

According to another alternative embodiment, a biological specimen processing system is a combination biological specimen imaging and review apparatus that is configured to acquire a first image of a fiducial mark on a biological specimen carrier, acquire a second image of a fiducial mark on a biological specimen carrier, compare the first and second fiducial mark images and determine whether the first and second fiducial mark images are of the same fiducial mark of the same biological specimen carrier based on the comparison.

In one or more embodiments, images are acquired of one fiducial mark and compared. Images may also be acquired of multiple fiducial marks on each slide, and sets of fiducial marks may then be compared. The comparison can be performed after a specimen is imaged and selected portions of the image are analyzed. If it is determined that the images are of the same fiducial mark or the same set of fiducial marks, then data associated with the selected portions of the acquired image of the biological specimen may be stored to a memory.

In one or more embodiments, comparison of fiducial mark images includes registering the first and second images so that the first and second images are substantially aligned with each other and then comparing pixels of the first image and corresponding pixels of the second image. Pixel comparisons may be performed based on differences of intensity values of corresponding pixels of the first and second images, and these difference values may be used to generate a difference image, e.g., if they satisfy certain threshold criteria.

Other and further aspects and embodiments of the invention are described herein and will become apparent upon review of the following detailed description and drawings.

BRIEF DESCRIPTION OF THE DRAWINGS

Referring now to the drawings in which like reference numbers represent corresponding parts throughout and in which.

DETAILED DESCRIPTION OF ILLUSTRATED EMBODIMENTS

Embodiments relate to systems and methods that compare images of microscope slides or other biological specimen carriers (generally referred to as "slides") in order to determine whether the images are of the same slide. One application of embodiments is to determine whether an operator replaced a first slide with a second slide while an imaging system is used to analyze a slide. Embodiments provide these advantages and capabilities without the need for a separate sensor incorporated in the slide holder or a macroscopic imaging device such as an OCR device for reading a label on the slide. Further aspects of embodiments are described with further reference to FIGS. 3-11.

Figure 3:
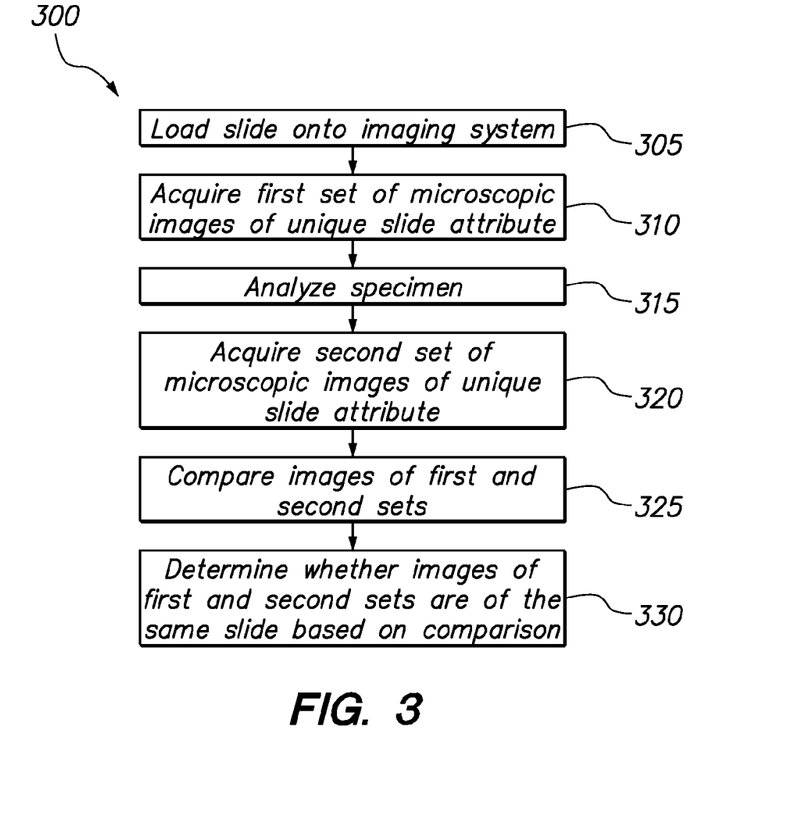
FIG. 3 is a flow chart of a method of identifying a slide using unique slide attributes according to one embodiment.

Referring to FIG. 3, a method 300 according to one embodiment is directed to identifying a slide 14 based on unique features of the slide 14 or of the specimen 12. At stage 305, a slide 14 is loaded into an imaging system. For example, the imaging system may include a slide holder on a motorized microscope stage, and a human operator may load the slide 14 into the slide holder.

Figure 2:
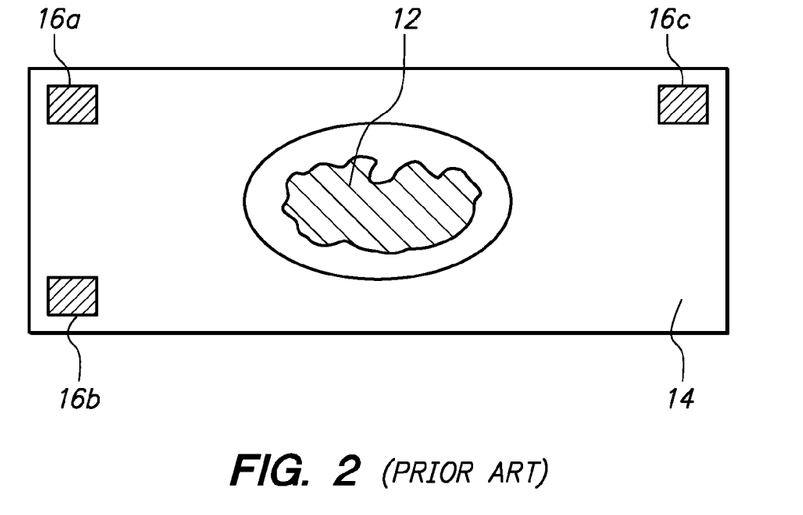
FIG. 2 illustrates a known microscope slide carrying a biological specimen and having fiducial marks.

At stage 310, the imaging system acquires images of several different locations on the slide 14 that contain unique features. According to one embodiment, these unique features are observable on a microscopic level. According to one embodiment, stage 310 involves acquiring microscopic images of one or more fiducial marks or paint marks 16 that were deposited on the slide 14, e.g., through silk-screening (as generally illustrated in FIG. 2). Silk-screening processes used for this purpose form fiducial marks 16 that vary from slide 14 to slide 14 when viewed on a microscopic level and, therefore, are provide unique attributes at a microscopic level. An imaging system may acquire images of these fiducial marks 16 as part of its regular processing, e.g., for registration purposes. Embodiments, however, utilize fiducial marks 16 and images of the same in a new way for purposes of slide identification.

At stage 315, some type of analysis is performed on the specimen 12 and may involve automatic screening, review by a human operator, or both, the result of which is generation of data that is to be associated with a slide 14. For example, the imaging system may acquire images of the specimen 12 and measure features of the cells or other biological material. As a further example, an operator may use the imaging system to review locations on the slide 14 that an automated imaging system has previously identified as requiring further review and human analysis. In this case, the imaging system may record the fact than the operator has viewed each of the previously identified locations. During normal use, an operator typically would not replace the slide 14 with another during this analysis, but could conceivably do so by mistake, especially if the operator is interrupted during the process of reviewing a slide 14.

At stage 320, the imaging system returns to the locations from stage 310 and acquires a new set of images of the unique slide 14 features, e.g., a new set of microscopic images of the same regions of one or more fiducial marks 16. At stage 325, each image of the first set of images acquired at stage 310 is compared to corresponding images of the second set of images acquired at stage 325 to determine whether the sets of images are of the same slide at stage 330.

If the images do not match, a determination can be made that the operator has replaced the slide 14 with another slide 14 during processing, and the imaging system may discard the data because a determination cannot be made to which slide 14 the data should be associated. At this stage, the operator might also be informed that the data has been discarded. Otherwise, if the microscopic images of the fiducial marks 16 match or substantially match, then it can be determined that a slide 14 has not been replaced by another slide during stage 315, and data associated with the slide 14 may be stored to a memory.

According to one embodiment, as shown in FIG. 2, the biological specimen 12 is prepared on a glass microscope slide 14 that includes three square paint or fiducial marks 16a-c (generally fiducial mark 16) that the imaging system uses to determine the orientation of the slide 14. The silk-screening process used to apply these three fiducial marks 16 results in variability from slide to slide when viewed on a microscopic scale. Embodiments advantageously utilize these unique slide 14 attributes to verify slide data and determine whether one slide has been swapped with another slide.

Embodiments may involve comparing images of a single fiducial mark 16, images of two fiducial marks 16a-b, images of three fiducial marks 16a-c, or different numbers of fiducial marks 16n as necessary. Comparisons involving larger numbers of fiducial marks 16 may make result in more accurate comparisons and slide identification.

Figure 4:
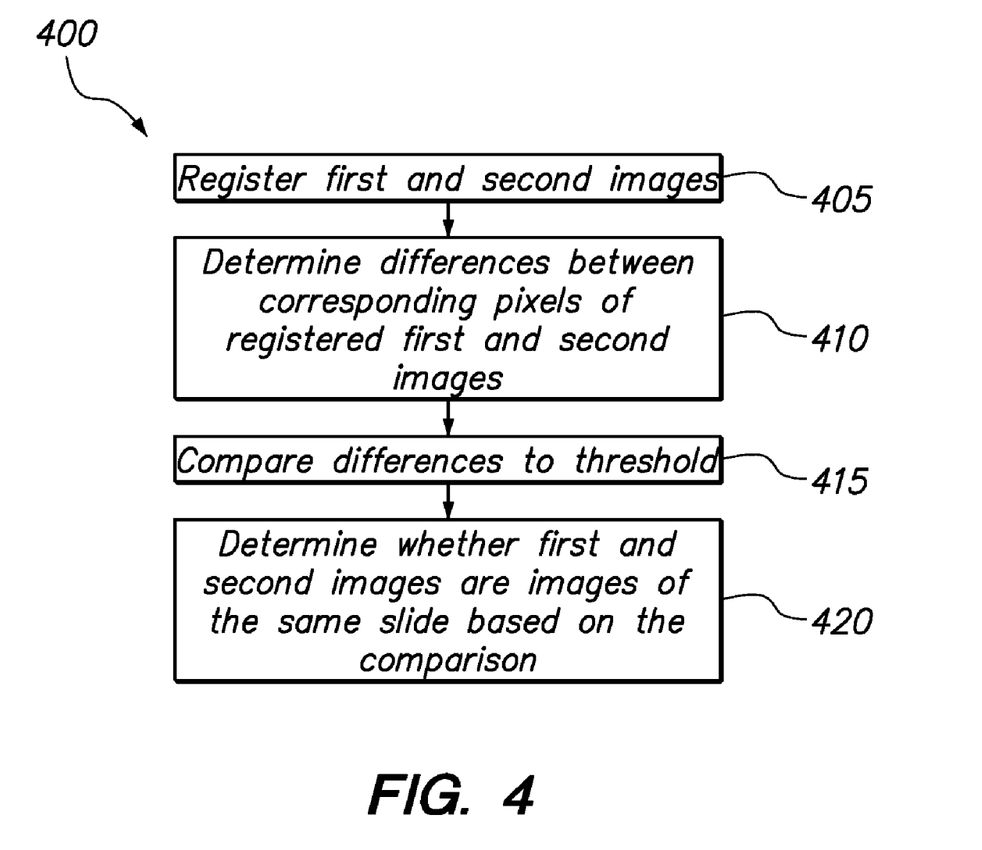
FIG. 4 is a flow chart of a method of registering and analyzing images of fiducial marks or other unique slide attributes.

Referring to FIG. 4, a method 400 according to one embodiment is directed to identifying a slide 14 and processing and comparing images of the same location of a slide 14 that were acquired at different times. According to one embodiment, each image is a microscopic image of a corner of a fiducial mark 16. Unless the slide 14 was replaced with another between the acquisition of the first image and the second, the two images are of the same fiducial mark 16.

At stage 405, the first and second images of fiducial mark 16 corners are registered. For example, stage 405 may involve determining a vector by which the second image should be translated by moving the stage in order to make the second image line up as closely as possible with the first image. Stage 405 corrects for any variation in the stage movement and ensures that if the images are of the same mark, each feature of the fiducial mark is now at nearly the same image coordinates in the first image and in the second image. FIGS. 5A-D illustrate one example of image registration in further detail.

Figure 5A:
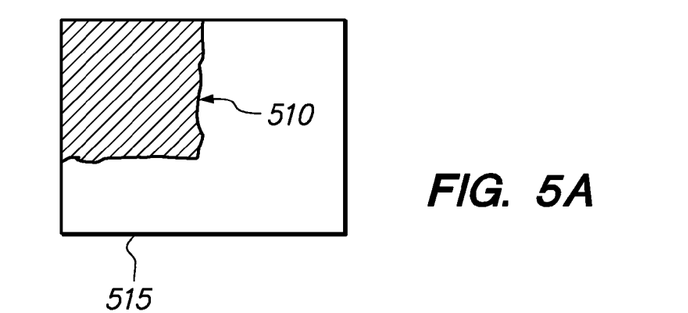
FIG. 5A generally illustrates a first image of a corner of a fiducial mark.
Figure 5B:
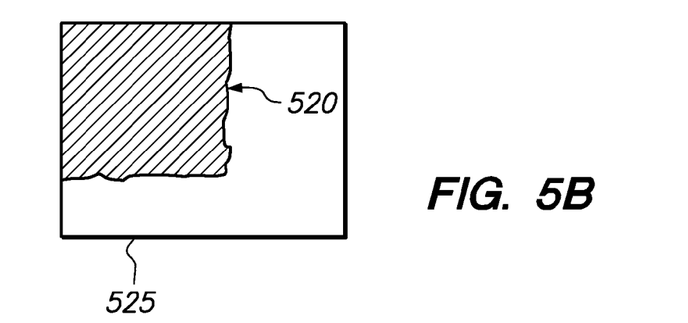
FIG. 5B generally illustrates a second image of a corner of a fiducial mark.
Figure 5C:
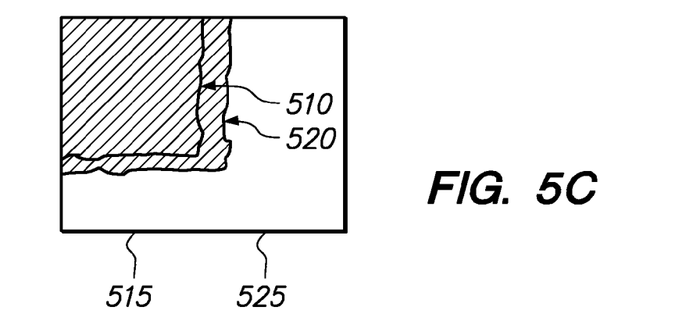
FIG. 5C illustrates the first and second images shown in FIGS. 5A-B superimposed on each other and poorly registered.
Figure 5D:
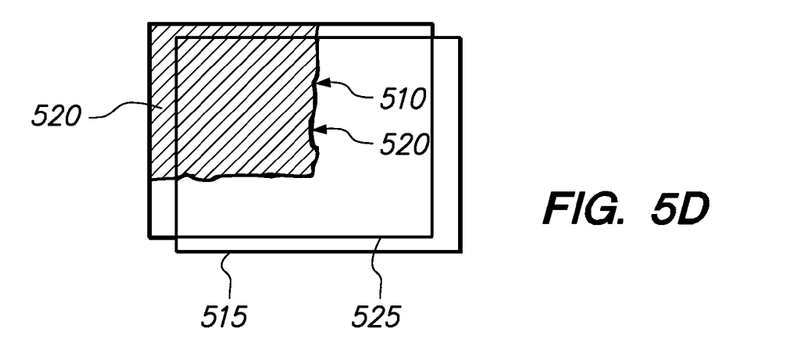
FIG. 5D illustrates the first and second images shown in FIGS. 5A-B that are well registered.

FIG. 5A illustrates a first image 515 of a corner of a fiducial mark 16 that is a square fiducial mark 510, and FIG. 5B illustrates a second image 525 of a fiducial mark 16 that is a square fiducial mark 520. The edges of the fiducial marks 510, 520 are slightly irregular. FIG. 5C illustrates the images 510, 520 that have been overlaid and partially overlap with each other. The corners of the fiducial marks 510, 520 are at different locations in the two images 515, 525 such that they are misaligned in this overlay. In FIG. 5D, the first image 515 has been translated down and to the right so that the fiducial mark 510, 520 corners are substantially aligned with each other.

No matter how well two images 515, 525 are registered, they will not match perfectly. One image may be offset from the other by a fraction of a pixel, and most image registration methods will only ensure that the two images are within half a pixel of being perfectly aligned. Also, due to noise in the camera sensor, most pixel values will vary from image to image. Therefore, there will typically be some difference between the two images 515, 525.

Referring again to FIG. 4, at stage 410, each pixel of the first image 515 is compared to the corresponding pixel of the aligned second image 525. This may be done, for example, by calculating the difference between the value of each pixel in the first image 515 and the value of the pixel at the same location in the second image 525, and adding together the squares of all the difference values. In one embodiment, this sum of squared errors is divided by the estimated length of the portion of the fiducial mark edge that is visible in the images, to yield a measurement of error per unit length. In another embodiment, the sum is instead divided by the total area of the image, to yield a measurement that is not dependent on image size. In another embodiment, the difference between two images 515, 525 is measured by taking the sum of squares of only those differences that have an absolute value greater than threshold, e.g., 20 grey values. Difference determinations using a threshold value may increase the accuracy of the difference measurement since differences of only a few grey values may be due to camera noise.

At stage 415, the difference determination from stage 410 is compared to a threshold. For example, two images 515, 525 might be considered to be different if the mean squared error is higher than a certain value. If the threshold is exceeded, then in stage 420, the images 515, 525 are determined to be of different marks and, therefore, the slides are determined to be different slides. Errors will occasionally be made in this determination, but very infrequently, especially if images 515, 525 from multiple fiducial marks are compared. One manner of comparing fiducial mark images 515, 525 is illustrated in further detail in FIGS. 6A-D.

Figure 6A:
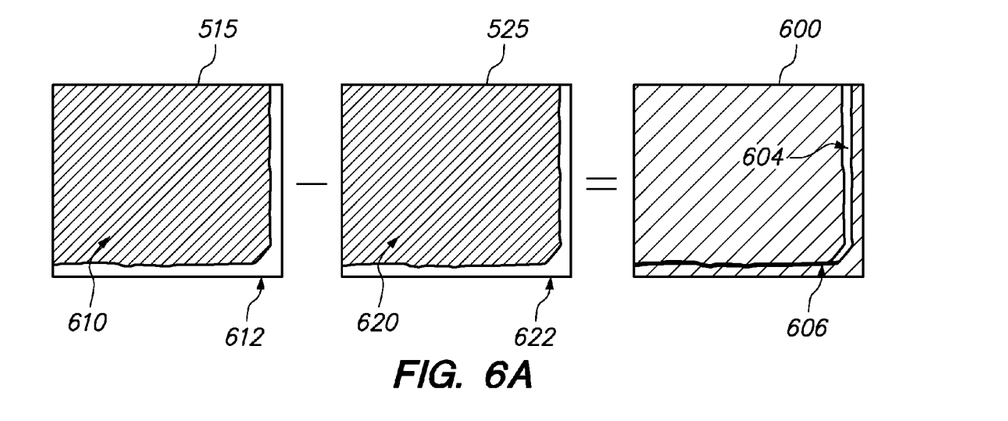
FIG. 6A illustrates an example of first and second registered images of the same fiducial mark and a difference image observable with embodiments and showing that the first and second images are nearly but not perfectly registered.
Figure 6B:
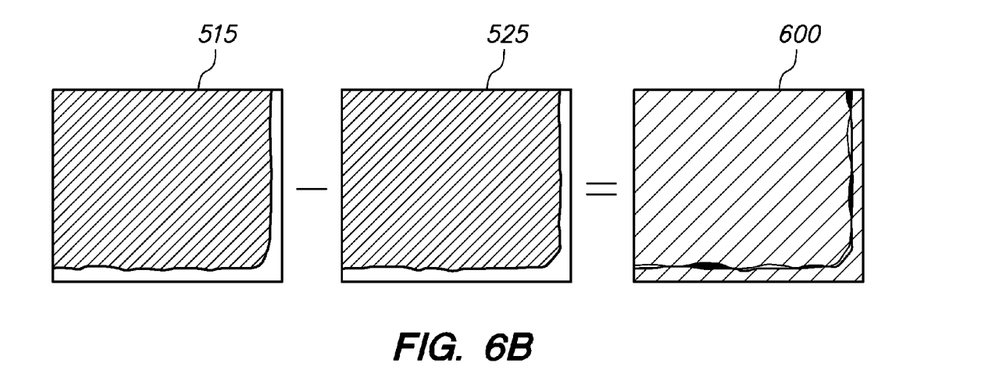
FIG. 6B illustrates an example of first and second registered images of different fiducial marks and resulting differences observable with embodiments.

FIG. 6A generally illustrates an example in which first and second images 515, 525 are nearly, but not perfectly, aligned. In the illustrated example, the first image 515 includes a corner 610 of a fiducial mark, which appears dark because it blocks almost all light from being transmitted. The fiducial mark corner 610 is surrounded by empty space 612, which is the glass of the slide with no objects present on it to block the light and is bright. Likewise, the second image 525 contains a fiducial mark corner 620 surrounded by empty space 622.

Subtracting the two images, i.e., subtracting the value of each pixel of the second image from the corresponding pixel of the first image, results in image 600, in which some pixels have negative values (shown as dark pixels), some have positive values (light pixels) and most are near to zero (grey pixels). Image subtraction is a known method use in image processing and, therefore, is not described in further detail.

Relative to the mark in the first image 515 of the fiducial mark corner 610, the fiducial mark corner 620 in the second image 525 is positioned slightly up and to the right. Because of this positioning, pixels along the right side of the mark have a higher value (i.e., are brighter) in the first image than in the second image, thereby resulting in the stripe of positive-valued pixels 604 in the difference image 600. Similarly, there is a row of negative values 606 along the bottom of the difference image 600 because some pixels on the bottom of the mark are brighter in the second image than in the first image. These differences show that the images 515, 525 are not well aligned.

Figure 6C:
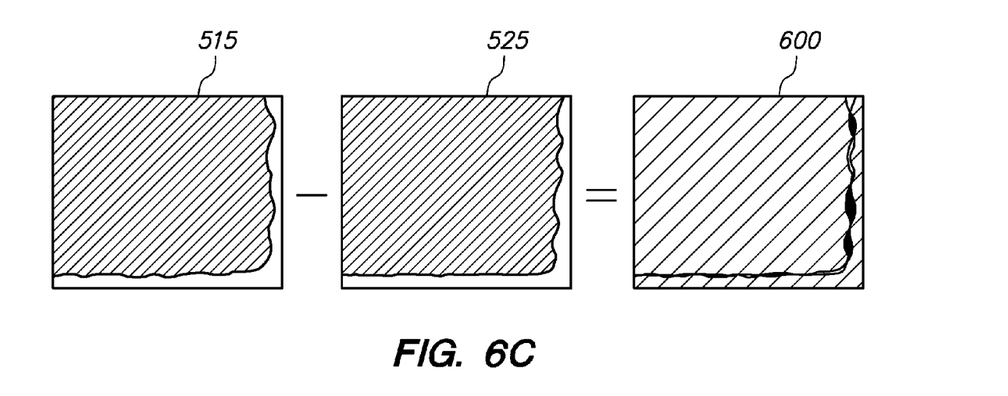
FIG. 6C illustrates another example of first and second registered images of different fiducial marks and pronounced differences observable with embodiments.

FIGS. 6C-D show examples where a first image 515 and a second image 525 have been registered as closely as possible, but there are still large differences between the two images 515, 525 because they are of different fiducial marks 510, 520. The differences between the fiducial marks in FIG. 6D are much greater than the differences in FIG. 6C, but in both cases these differences are still considerable and serve as the basis for determining that the first and second images are images of different fiducial marks.

Referring to FIG. 6D, any area of positive differences 604 along the right side of the difference image 600 could be eliminated by shifting the second image 525 left before subtracting. This could make the pixels of the edge line up in that particular region, but as a result other portions of the edge would be even more poorly aligned. Similarly, regions with negative differences 606 along the right side could be eliminated by shifting the second image 525 right. In a sense, each positive pixel on the right side is "voting" for the second image 525 to be shifted left; each negative pixel, for it to be shifted right. If the number of "votes" for each direction is approximately equal, the two images are aligned as well as they can be.

According to one embodiment, when the fiducial mark corner is in the top left of the image, the image registration can be done in a stepwise fashion by examining the difference values along the right hand side and bottom of the image, and shifting the second image depending on whether there are more negative pixels than positive ones. It should be understood that the same method could be used regardless of which corner of the image is filled by the mark, but the top left corner is chosen here as one example of how embodiments may be implemented.

Figure 7A:
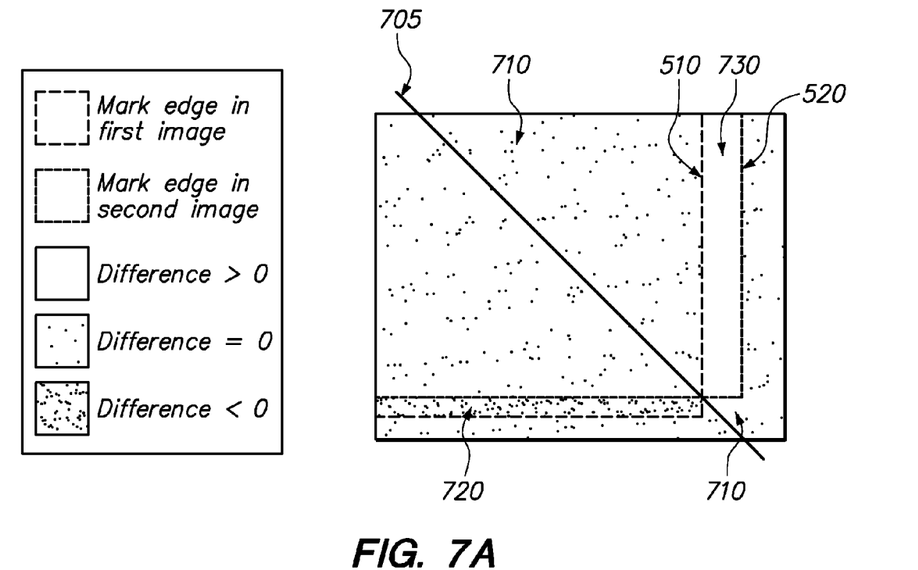
FIG. 7A generally illustrates registration of first and second images and a second image that should be moved to the left and downward to reduce or eliminate a positive x bias and a negative y bias.
Figure 7B:
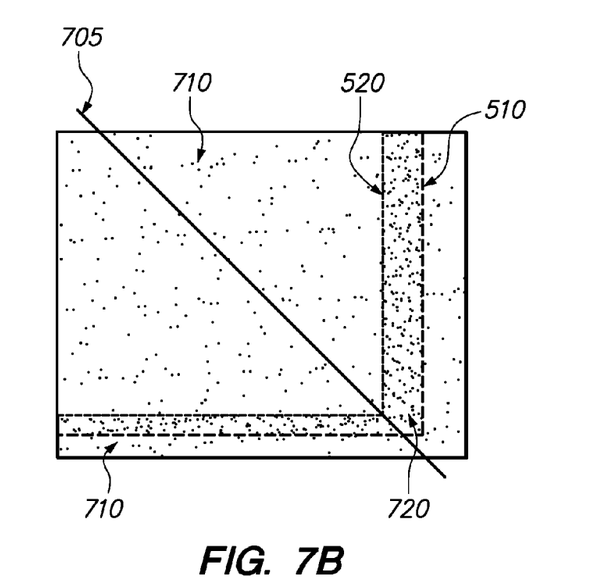
FIG. 7B generally illustrates registration of first and second images and a second image that should be moved to the right and downward to reduce or eliminate a negative x bias and a negative y bias.

FIGS. 7A-B illustrate examples of stepwise registration in further detail. In the illustrated examples, each difference image is divided by a reference line 705 drawn at a 45 degree angle. This 45 degree line 705 separates pixels of the bottom edge of the fiducial mark from the pixels of the right edge of the mark. First, all the pixels above the line can be examined, counting the number of pixels significantly greater than zero and significantly less (730, 720). The difference of these values is referred to in the figure as the "xBias." Similarly, pixels below the line can be examined and the number of pixels significantly less than or greater than zero (730, 720) can be counted. The difference between these counts is the "yBias."

In FIG. 7A, for example, the corner of the fiducial mark 510 in the first image 515 is to the left of, and below, the corner of the fiducial mark 520 in the second image 525, similar to the fiducial marks in FIG. 6A. When the images are subtracted, a region 730 of the right side of the difference image is positive, and a region 740 of the bottom is negative. The line 705 divides the bottom edge of the mark from the right side. Counting the number of negative and positive pixels above and below this line 705 gives a positive xBias and a negative yBias, meaning that the second image should be shifted down and to the left to line it up with the first.

In one embodiment, this shifting can be done one pixel width at a time until the biases in both axes are nearly zero. As a more efficient alternative, the distance to shift the image could be estimated from the magnitude of the biases.

Although various figures have been described in terms of translating the second image to match the first, the first image could also be translated in the same way to line it up with the first. Further, this translation can be done simply by storing the translation vector and adding it to each set of coordinates from the first image in order to get the corresponding coordinates in the second image. Thus, this translation need not actually involve a modification of the image data.

Further, although embodiments are described with reference to certain image registration techniques, it should be understood that other registration methods may also be utilized. Accordingly, the example registration methods described with reference to various figures are provided as examples of how embodiments may be implemented. Additionally, although embodiments are described with reference to a single fiducial mark 16, the same techniques can be applied to multiple fiducial marks on every slide.

Thus, with embodiments, a first image 515 of a fiducial mark 510 can be compared to a second image 525 acquired at a later time and at the same slide location, in order to determine whether the operator has replaced the first slide with a second slide in the time period between the time when the first image 515 was acquired and the time when the second image 525 was acquired. Thus, embodiments provide a safeguard against data being associated with the wrong slide. These benefits are achieved without the use of an integrated slide sensor, OCR camera, or bar code scanner, as is required on various known systems. Further, embodiments are well suited to systems that already acquire images of fiducial marks 16 for purposes of calibration since embodiments can build upon and enhance such systems. Thus, embodiments advantageously utilize fiducial marks 16 in a new way, and in a way that is not related to their customary calibration use, to identify slides and determine whether a slide has been swapped for another slide.

Further, given first and second images 515, 525 may or may not be of the same fiducial mark, it is estimated that embodiments described above will falsely label two images of the same mark as different marks or vice versa only very rarely, e.g., less than one in one thousand times. If three fiducial marks on the slide are compared, it is estimated that the chance of a slide swap being missed, or of the system thinking a slide is different when it is not, is less than one in one billion. This is a degree of accuracy sufficiently high to make this a feasible method for detecting slide removal.

Although embodiments are described with reference to conventional fiducial marks 16 that are in the form of a solid rectangle or square, embodiments can be implemented using marks of other shapes, sizes, and configurations. For example, referring to FIGS. 8A-C one or more fiducial marks 816a-c (generally 816) could comprise four smaller marks 805 arranged. in a square, or a ring 820 with a hollow center. These embodiments would make a longer edge be visible in the camera's field of view, thus providing more features to use for comparison.

Embodiments can also be implemented by comparing first and second images 515, 525 of unique features of a slide other than fiducial marks 16. In one alternative embodiment, referring to FIG. 9, images 515, 525 could be acquired of the frosted section 905 of a slide 14. Some regions of the frosted section 905 will transmit more light than others, and microscopic bubbles are also visible. The frosted section 905 of the slide 14 is usually used as a writing surface to mark a slide, or as the place where a label is affixed, but embodiments may utilize the frosted section 905 in a new way by examining the microscopic features of the paint layer to identify slides and determine whether a slide has been swapped for another slide.

Other embodiments can be implemented by imaging other unique features of the slide. These unique features may be applied or attached to a slide, or integrated, embedded, or etched in the slide. Accordingly, the fiducial marks and the frosted section described above are provided as illustrative examples of how embodiments may be implemented by using features of a slide in a manner that differs from their intended and regular use.

Figure 10:
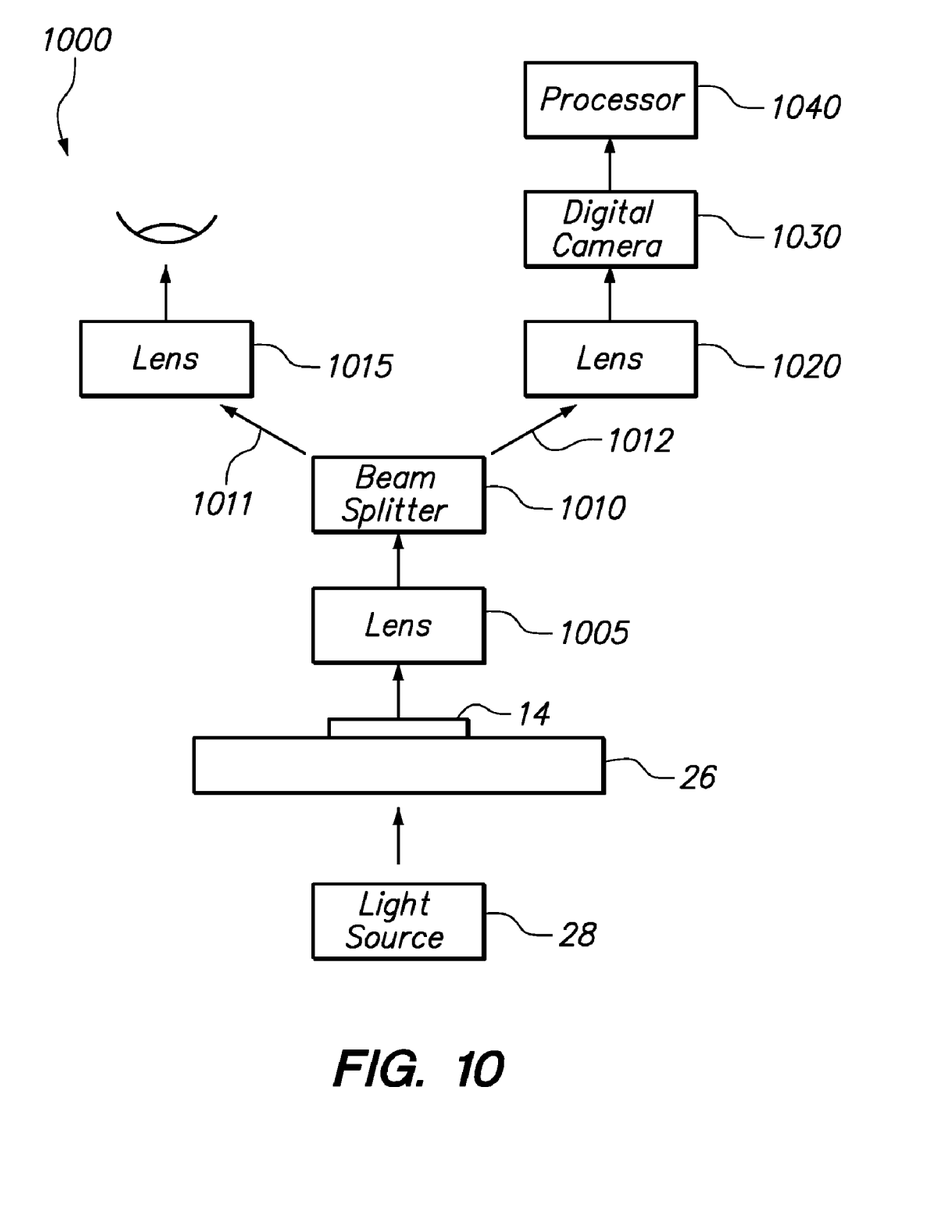
FIG. 10 generally illustrates components of an integrated biological specimen imaging/review system in which embodiments may be implemented.
Figure 11:
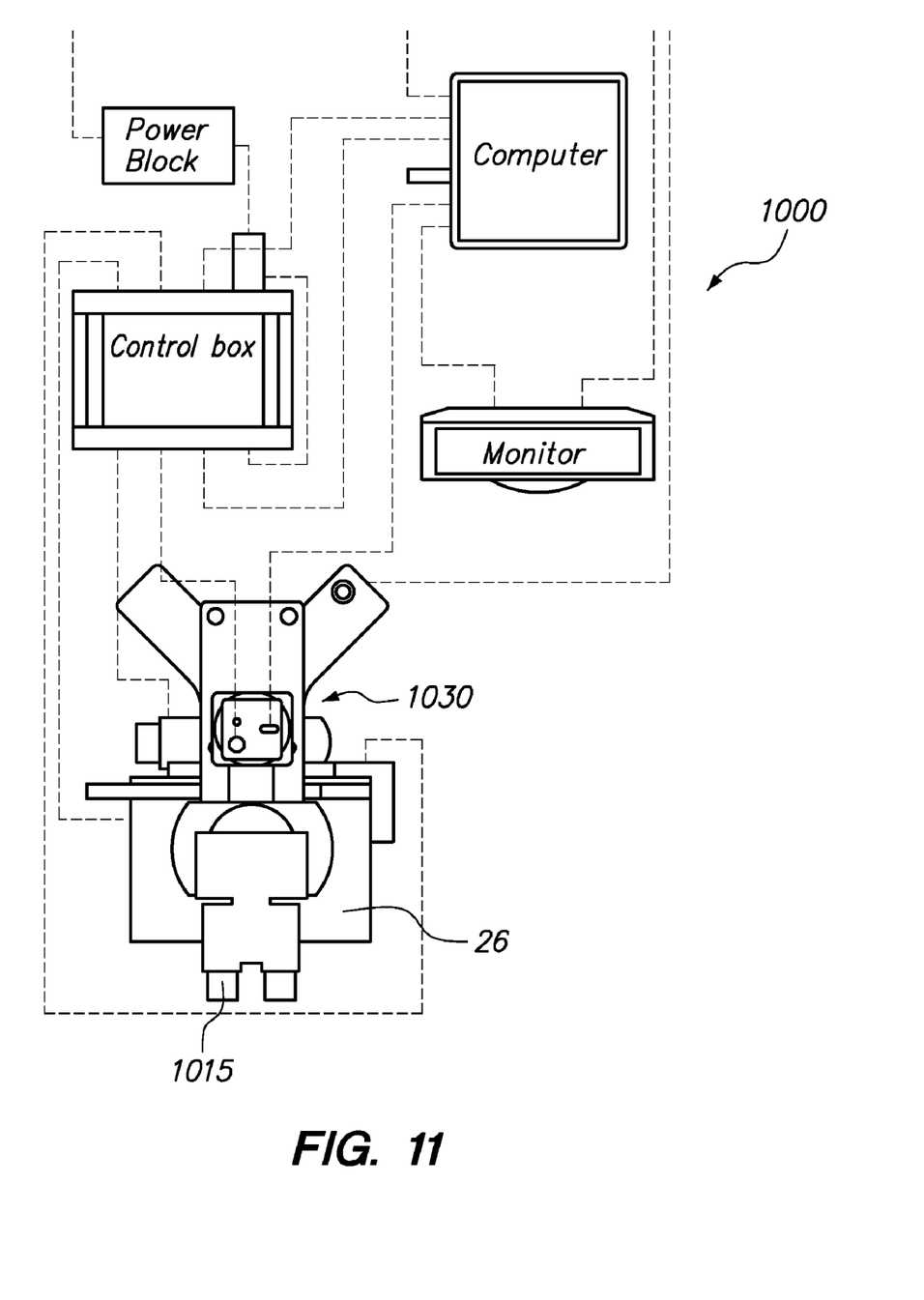
FIG. 11 further illustrates components of an integrated biological specimen imaging/review system in which embodiments may be implemented.

Further, embodiments may be implemented in various imaging systems. For example, FIGS. 10 and 11 generally illustrate an integrated imaging/review microscope system 1000 in which embodiments may be implemented. With the system 1000 shown in FIG. 10, the same microscope may be used for imaging and for subsequent review of biological specimens 12, one slide 14 at a time. The system 1000 is configured so that light that passes from a light source 28, through the biological specimen 12 and an objective lens 1005 and then to a beam splitter 1010, which directs light in a first direction 1011 through an ocular lens 1015 for review by a technician, and in a second direction 1012, through another lens 1020, for a digital camera 1030 and a processor 1040 that acquire and process images acquired by the digital camera to select OOIs for review by the cytotechnologist. FIG. 11 illustrates in further detail one manner in which an integrated imaging/review system 1000 may be implemented. Embodiments may be implemented as software, hardware or a combination of hardware and software, e.g., as part of the processor 1040 or a separate processor or memory.

One example of an integrated imager/review station 1000 in which embodiments may be implemented allows imaging and review of a specimen slide 14 by an operator (e.g., as a desktop imaging/review system) one slide 14 at a time. Embodiments are particularly suited for use with the microscope stage 26 of systems that do not include an integrated sensor for determining when a slide 14 has been removed from the stage 26 and is operated by a user. If a user does not inform the system that a new slide 14 has been placed on the stage 26, the user will be brought to FOI locations of a previous slide 14.

Figure 8A:
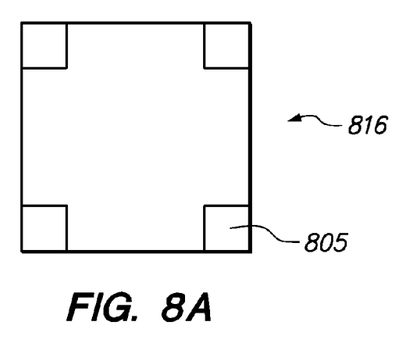
FIG. 8A illustrates an alternative fiducial mark configuration that can be utilized with embodiments as unique slide fingerprints.
Figure 8B:
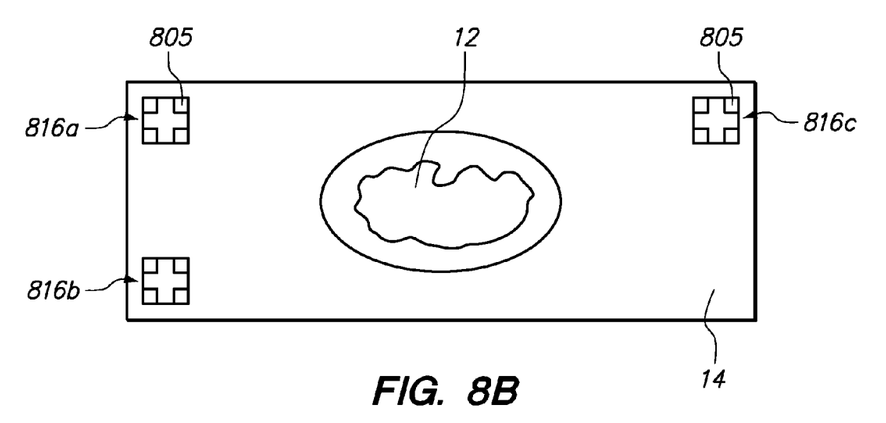
FIG. 8B illustrates a specimen slide having a plurality of fiducial marks as shown in FIG. 8A according to one embodiment.
Figure 8C:
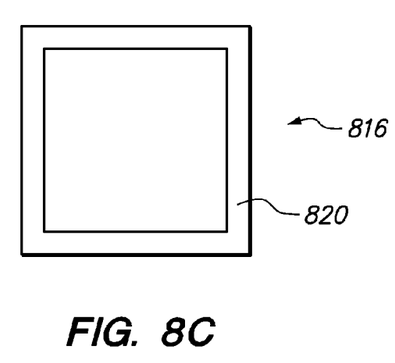
FIG. 8C illustrates another alternative fiducial mark configuration that can be utilized with embodiments as unique fingerprints.
Figure 9:
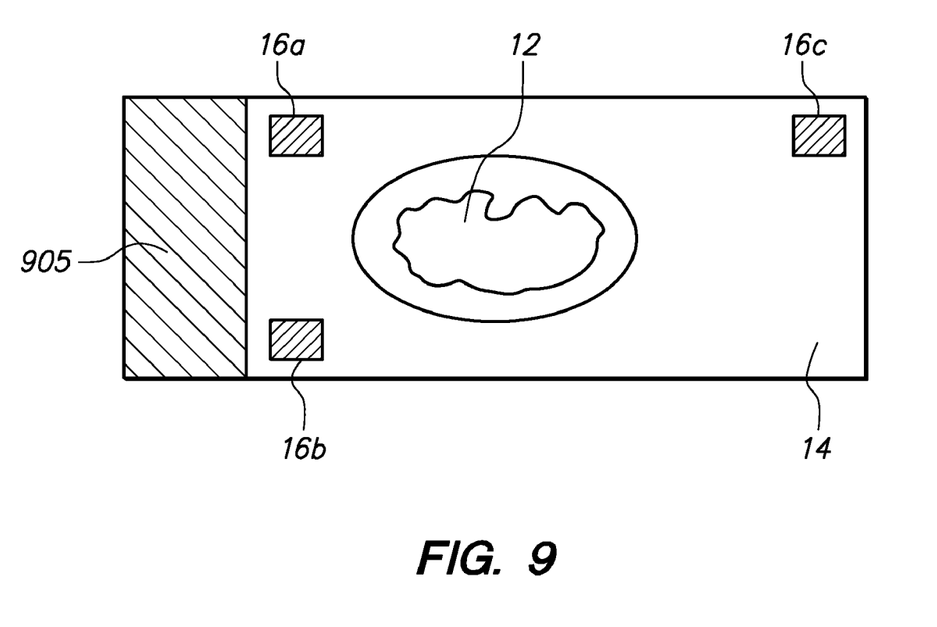
FIG. 9 illustrates a specimen slide having a frosted section that can be used as a unique fingerprint according to another embodiment.

With embodiments, images 510, 520 of fiducial marks can be analyzed to determine whether the images 510, 520 are images of the same fiducial mark 16 (if each image 510, 520 includes a single fiducial mark) or of the same fiducial marks 16a-n (e.g., if each image 510, 520 includes three fiducial marks 16a-c as shown in FIG. 8). This analysis is performed to determine whether the same slide 14 was on the stage 26 when the images 510, 520 were acquired, and that the user did not switch the slide 14, or that the images 510, 520 are images of different fiducial marks 16 and of specimen slides, thus indicating that the user has switched the slide with another slide.

Various changes and modifications may be made without departing from the scope of the invention and various embodiments thereof. For example, embodiments may also be implemented by imaging portions of the specimen that is prepared on the slide, or by imaging any other element of the slide that does not change and that varies from slide to slide. Thus, embodiments are intended to cover alternatives, modifications, and equivalents that fall within the scope of the claims.

What is claimed is:

1. A method of identifying a biological specimen carrier, comprising:
   acquiring a first image of a fiducial mark on a biological specimen carrier;
   acquiring a second image of a fiducial mark on a biological specimen carrier;
   comparing the first and second images; and
   determining whether the first and second images are of the same fiducial mark of the same biological specimen carrier based on the comparison.

2. The method of claim 1, prior to acquiring the second image, the method further comprising:
   analyzing a biological specimen on the biological specimen carrier having the fiducial mark in the first image, wherein analyzing the biological specimen comprises acquiring an image of the biological specimen, and selecting portions of the acquired image of the biological specimen.

3. The method of claim 2, wherein a determination is made that the first and second images are images of the same fiducial mark of the same biological specimen carrier, the method further comprising storing data associated with the selected portions of the acquired image of the biological specimen to a memory.

4. The method of claim 1, comparing the first and second images further comprising:
   registering the first and second images so that the first and second images are substantially aligned with each other; and
   comparing pixels of the first image and corresponding pixels of the second image by determining differences of intensity values of pixels of the first image and intensity values of corresponding pixels of the second image.

5. The method of claim 4, determining differences of intensity values further comprising:
   generating a difference image, each pixel of the difference image representing a difference between an intensity of a pixel of the first image and an intensity of a corresponding pixel of the second image.

6. The method of claim 4, further comprising:
   selecting intensity difference values that are greater than an intensity difference threshold value; and
   determining whether the selected intensity difference values satisfy a cutoff threshold, wherein a determination is made that the first and second images are of the same fiducial mark of the same biological specimen carrier if the cutoff threshold is satisfied.

7. A method of identifying a biological specimen carrier, comprising:
   acquiring a first image of a first plurality of fiducial marks on a biological specimen carrier;

acquiring a second image of a second plurality of fiducial marks on a biological specimen carrier;

comparing the first and second images; and determining whether the first and second images are of the same plurality of fiducial marks of the same biological specimen carrier based on the comparison.

8. The method of claim 7, wherein acquiring the first image comprises acquiring a first image of three fiducial marks, and acquiring the second image comprises acquiring a second image of three fiducial marks.

9. The method of claim 8, prior to acquiring the second image, the method further comprising analyzing a biological specimen on the biological specimen carrier having the plurality of fiducial marks in the first image.

10. The method of claim 9, analyzing the biological specimen comprising:

acquiring an image of the biological specimen; and selecting portions of the acquired image of the biological specimen.

11. The method of claim 10, wherein a determination is made that the first and second images are images of the same plurality of fiducial marks of the same biological specimen carrier, the method further comprising:

storing data associated with the selected portions of the acquired image of the biological specimen to a memory.

12. The method of claim 7, comparing the first and second images further comprising:

registering the first and second images such that the first and second images are substantially aligned with each other; and comparing pixels of the first image and corresponding pixels of the second image.

13. The method of claim 12, comparing corresponding pixels of the first and second images further comprising:

determining differences of intensity values of pixels of the first image and intensity values of corresponding pixels of the second image.

14. The method of claim 13, determining differences of intensity values further comprising:

generating a difference image, each pixel of the difference image representing a difference between an intensity of a pixel of the first image and an intensity of a corresponding pixel of the second image.

15. The method of claim 14, further comprising:

selecting intensity difference values that are greater than a pre-determined intensity difference threshold value; and determining whether the selected intensity difference values satisfy a cutoff threshold.

16. The method of claim 15, wherein a determination is made that the first and second images are of the same plurality of fiducial marks of the same biological specimen carrier if the error per unit value is less than the cutoff threshold.

17. A biological specimen processing system, comprising:

a combination biological specimen imaging and review apparatus, the apparatus being configured to acquire a first image of a fiducial mark on a biological specimen carrier, acquire a second image of a fiducial mark on a biological specimen carrier, compare the first and second images and determine whether the first and second images are of the same fiducial mark of the same biological specimen carrier based on the comparison.

18. The system of claim 17, wherein the apparatus is configured to compare a first image of a plurality of fiducial marks and a second image of a plurality of fiducial marks.

19. The system of claim 17, the apparatus including a memory, wherein the apparatus is configured to acquire an image of a biological specimen, select portions of the acquired image, and store data associated with the selected portions to the memory if a determination is made that the first and second fiducial mark images are images of the same fiducial mark of the same biological specimen carrier.

* * * * *